May 21, 1929.  R. L. GREIST  1,714,088
RACING TRACK APPARATUS
Filed Feb. 11, 1927    2 Sheets-Sheet 1
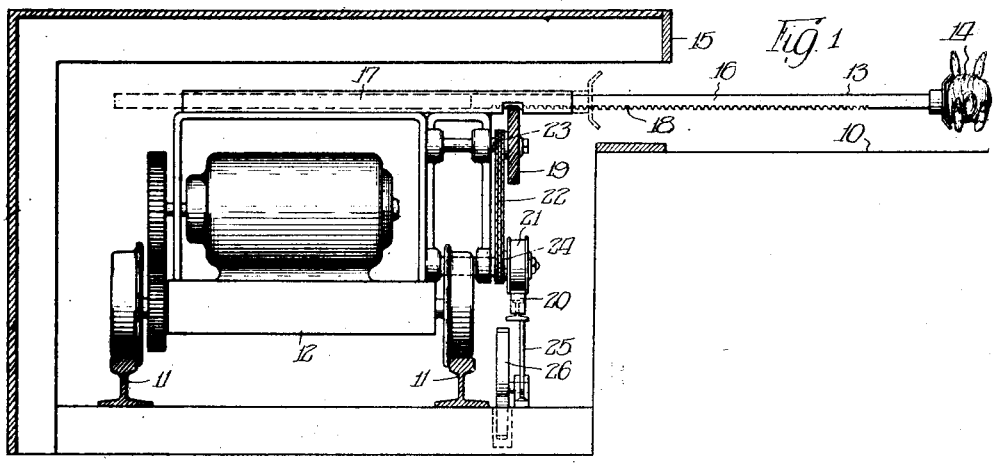
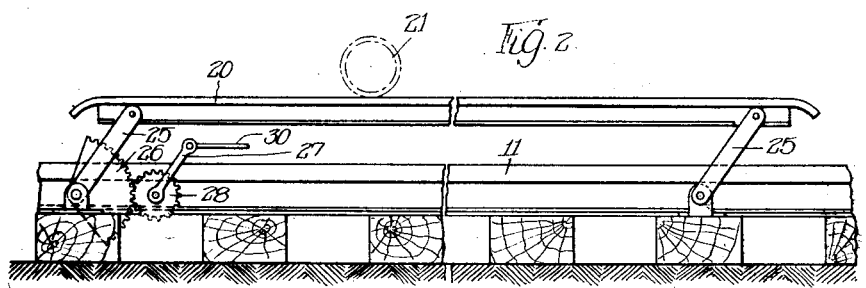
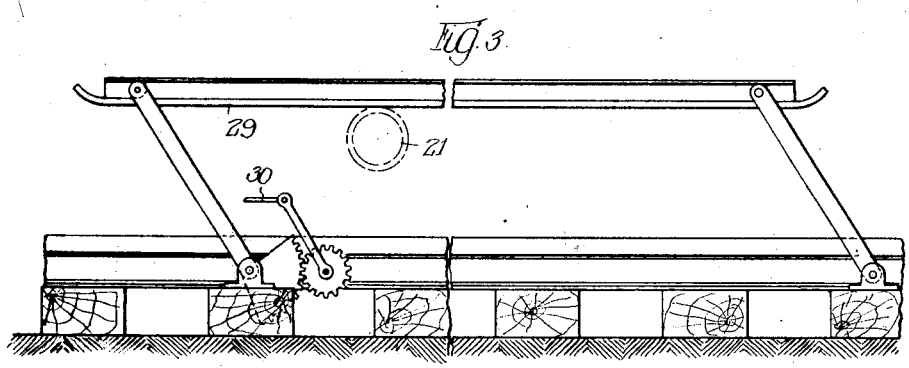
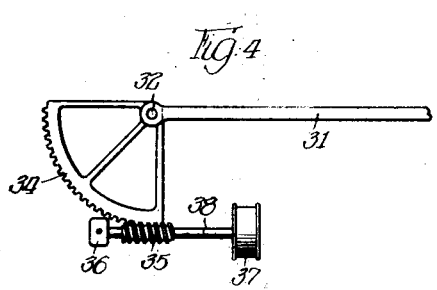
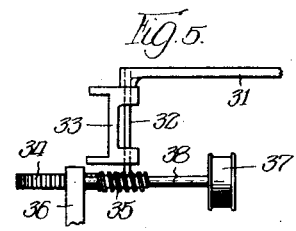
Witness:
R. Burkhardt
Inventor:
Raymond L. Greist,
By Cromwell Greist Warden
attys.

May 21, 1929.  R. L. GREIST  1,714,088
RACING TRACK APPARATUS
Filed Feb. 11, 1927    2 Sheets-Sheet 2

Witness:
R. Burkhardt.

Inventor:
Raymond L. Greist,
By Cromwell, Greist & Warden
attys.

Patented May 21, 1929.

1,714,088

UNITED STATES PATENT OFFICE.

RAYMOND L. GREIST, OF CHICAGO, ILLINOIS, ASSIGNOR TO ELECTRIC HOLDING CORPORATION, OF CHICAGO, ILLINOIS, A CORPORATION OF DELAWARE.

RACING-TRACK APPARATUS.

Application filed February 11, 1927. Serial No. 167,417.

The present invention has to do with racing track apparatus of the type in which a dummy rabbit or other suitable lure is caused to travel about a track at a high rate of speed with a number of racing dogs in pursuit.

The object of the invention is to provide, in connection with such an apparatus, improved means for causing the lure to disappear at the end of a race.

In order that the invention may be readily understood, three different forms of the same are herein illustrated and described, but it will of course be appreciated that such forms are chosen merely for the purpose of exemplification, and that the invention is susceptible of embodiment in other structurally modified forms coming equally within the comprehensive scope of the claims.

In the accompanying drawings:

Fig. 1 is a vertical transverse section through a dog racing track equipped with the mechanism of the invention;

Fig. 2 is a side view of the lure-retracting rail;

Fig. 3 is a similar view of the lure-projecting rail;

Fig. 4 is a plan view of a modified form of the mechanism;

Fig. 5 is an end view of the mechanism shown in Fig. 4;

Figure 6:
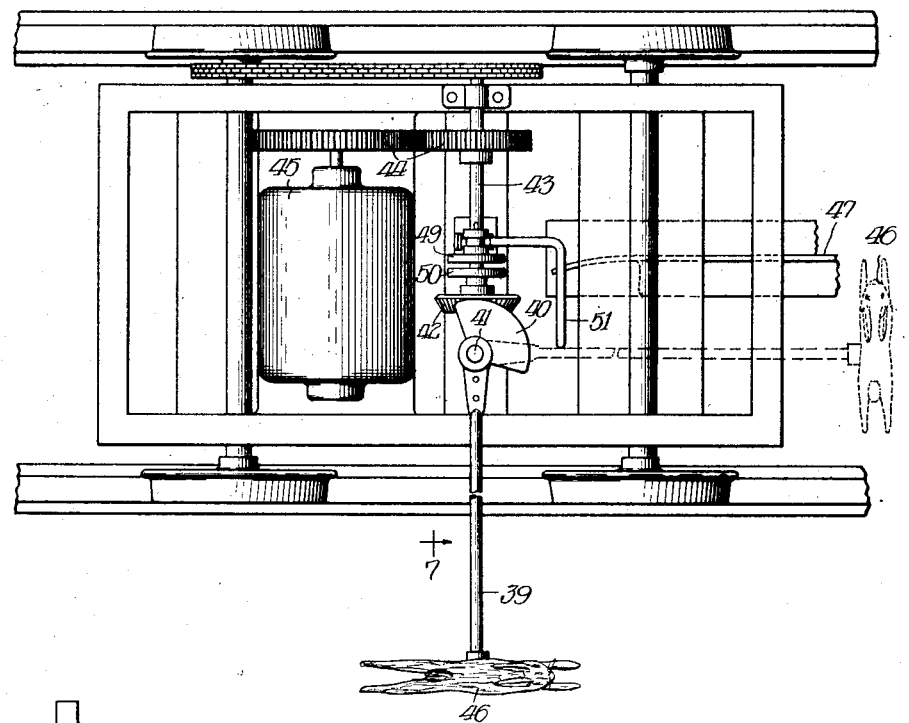
Fig. 6 is a plan view of another modified form of the mechanism.

A racing track apparatus such as that here under consideration generally includes an oval course 10 about which the dogs race, a narrow railway track 11 along one side of the course and preferably at a lower level than the same, a carriage 12 which moves along the track at a high rate of speed, a lure-supporting arm 13 which is mounted on the carriage and extends laterally therefrom out over the course, a lure 14 on the outer end of the arm, and a housing 15 which conceals the track and carriage.

The present invention resides in the novel construction, arrangement, operation and control of the lure-supporting arm 13.

Referring to Figs. 1, 2 and 3 of the drawings, it will be observed that the arm 13 is of telescopic construction, and includes a rod 16 and a tube 17. When the lure 14 is in racing position, the rod 16 projects from the tube 17 as shown in full lines in Fig. 1, and, when the lure is in concealed position, the rod is retracted within the tube as shown in dotted lines. The bottom surface of the rod 16 is formed as a rack 18, and is meshed with a worm gear 19 on the carriage. When the gear 19 is rotated in one direction, the rod 16 will be retracted into the tube, and, when the gear is rotated in the opposite direction, the rod will be projected again.

A rail 20 extends for a short distance along the track at a location opposite that point in the course where it is desired to have the lure disappear from the sight of the dogs in pursuit, and such rail is adapted to engage with and cause rotation of a wheel 21 on the carriage when the carriage reaches that point. The wheel 21 and the gear 19 are connected together by a chain 22 which is trained over sprockets 23 and 24 associated with the same, and any rotation of the wheel 21 is therefore imparted to the gear 19.

From the foregoing description, it will be understood that when the wheel 21 comes into engagement with the rail 20 and is rotated, the gear 19 will be rotated, and the rod 16 will be retracted into the tube 17 to a position wherein the lure 14 on the rod is effectively concealed, either beneath the edge of the housing 15 or beneath a suitable extension along the edge of the housing constructed at the point of escape.

Inasmuch as it is often the practice to have the lure with the dogs in pursuit completely encircle the track before the disappearance of the lure takes place, the rail 20 is made vertically adjustable, so that it may be lowered to a position where the wheel 21 will not engage with the rail when the carriage passes the same for the first time. The rail is shown in Fig. 2 as being supported at its ends on spaced parallel links 25. One of the links is secured to and pivoted concentrically with a segment gear 26, and an operating crank 27 is secured to and pivoted concentrically with a reduction gear 28 which is in mesh with the gear 26. As a result, the rail 20 may be raised or lowered by turning the crank 27.

Another rail 29 extends for a short distance along the track at a point beyond the rail 20 for the purpose of engaging with and rotating the wheel 21 in the opposite direction, whereby to return the retracted rod and lure again into racing position. The rail 29 engages with the upper, instead of the lower, side of the wheel 21, and is adjustable vertically in the same manner as the rail 20. The mechanisms for adjusting the rails 20 and 29 may be operated simultaneously through a suitable connection 30 therebetween.

In Figs. 4 and 5 is shown another form of the lure-supporting arm. The arm 31 which carries the lure is secured to a vertical shaft 32 journaled in a bracket 33 on the carriage, a segment gear 34 is secured to the shaft 32, a worm 35 is journaled in another bracket 36 on the carriage, and a wheel 37 is secured to an axial extension 38 of the worm for coaction with two retraction and projection rails such as those shown in Figs. 2 and 3.

Figure 7:
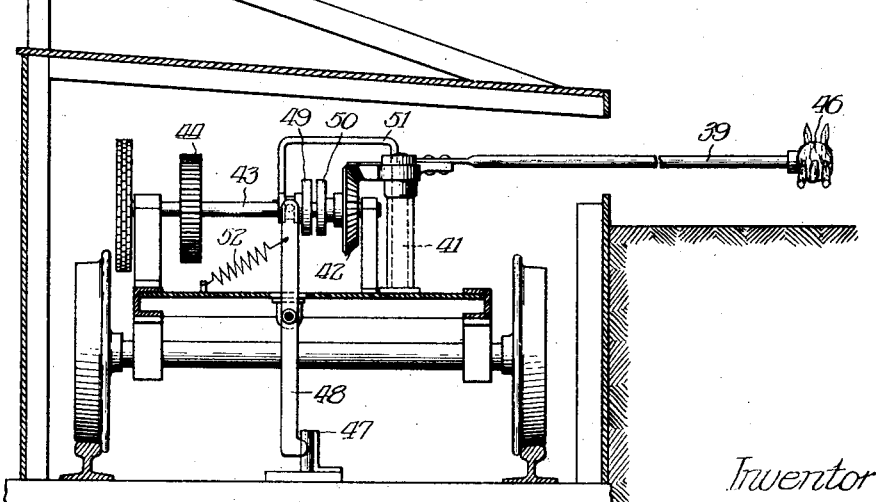
Fig. 7 is a vertical transverse section, taken on the line 7—7 of Fig. 6.

In Figs. 6 and 7 is shown still another form of the lure-supporting arm. The arm 39 is secured radially to the back of a beveled segment gear 40 journaled on a vertical spindle 41. The gear 40 is in mesh with a beveled gear 42 which is journaled on a shaft 43 which is driven through suitable gears 44 from the driving motor 45. When the lure 46 on the arm reaches that point along the course where it is supposed to disappear, a rail 47 along the track engages with and oscillates a pivoted lever 48. The lever 48 moves a clutch disk 49 which is secured to the shaft 43 into frictional coaction with a similar clutch disk 50 which is secured to the gear 42, whereupon the gear 42 is rotated by the shaft 43, and the arm 39 on the gear 40 is swung a partial revolution to a position wherein the lure 46 is carried beneath the housing, as shown in dotted lines in Fig. 6. When the lure reaches such concealed position, the clutch disks 49 and 50 are positively separated by contact of the arm 39 with an angular projection 51 which is associated with the upper end of the clutch-shifting lever 48. When the lure is to be used again, it may be swung easily by hand into racing position. Instead of using a trip arrangement such as the projection 51 for the purpose of disengaging the clutch, a spring 52 may be connected with the clutch-shifting lever 48 to accomplish the same purpose, or both the trip and the spring may be employed.

I claim:

1. In dog racing apparatus, a course, a railway adjacent the course, a carriage on the railway, a movable arm projecting from the carriage, a lure supported by the arm over the course, a structure for concealing certain portions of the apparatus, a rotatable member on the carriage, a connection between the member and the arm for moving the arm and lure relative to the carriage from a position over the course into a concealed position adjacent the structure when the member is rotated in one direction and for returning the arm and lure to a position over the course when the member is rotated in the opposite direction, and means for first rotating the member in one direction and then in the opposite direction.

2. In dog racing apparatus, a course, a railway adjacent the course, a carriage on the railway, a movable arm projecting from the carriage, a lure supported by the arm over the course, a structure for concealing certain portions of the apparatus, a rotatable member on the carriage, a connection between the member and the arm for moving the arm and lure relative to the carriage from a position over the course into a concealed position adjacent the structure when the member is rotated, and a rail extending for a short distance adjacent the railway to engage with and rotate the member when the carriage passes that point.

3. In dog racing apparatus, a course, a railway adjacent the course, a carriage on the railway, a movable arm projecting from the carriage, a lure supported by the arm over the course, a structure for concealing certain portions of the apparatus, a rotatable member on the carriage, a connection between the member and the arm for moving the arm and lure relative to the carriage from a position over the course into a concealed position adjacent the structure when the member is rotated in one direction and for returning the arm and lure to a position over the course when the member is rotated in the opposite direction, a rail extending for a short distance adjacent the railway to engage with and rotate the member in one direction when the carriage passes that point, and another rail extending for a short distance adjacent the railway beyond the first rail to engage with and rotate the member in the opposite direction when the carriage passes that point.

4. In dog racing apparatus, a course, a railway adjacent the course, a carriage on the railway, a movable arm projecting from the carriage, a lure supported by the arm over the course, a structure for concealing certain portions of the apparatus, a rotatable member on the carriage, a connection between the member and the arm for moving the arm and lure relative to the carriage from a position over the course into a concealed position adjacent the structure when the member is rotated in one direction and for returning the arm and lure to a position over the course when the member is rotated in the opposite direction, a rail extending for a short distance adjacent the railway to engage with and rotate the member in one direction when the carriage passes that point, another rail extending for a short distance adjacent the railway beyond the first rail to engage with and rotate the member in the opposite direction when the carriage passes that point, and means for shifting the rails into positions wherein they will not engage with the rotatable member.

In testimony whereof I have hereunto subscribed my name.

RAYMOND L. GREIST.